Patented Apr. 7, 1925.

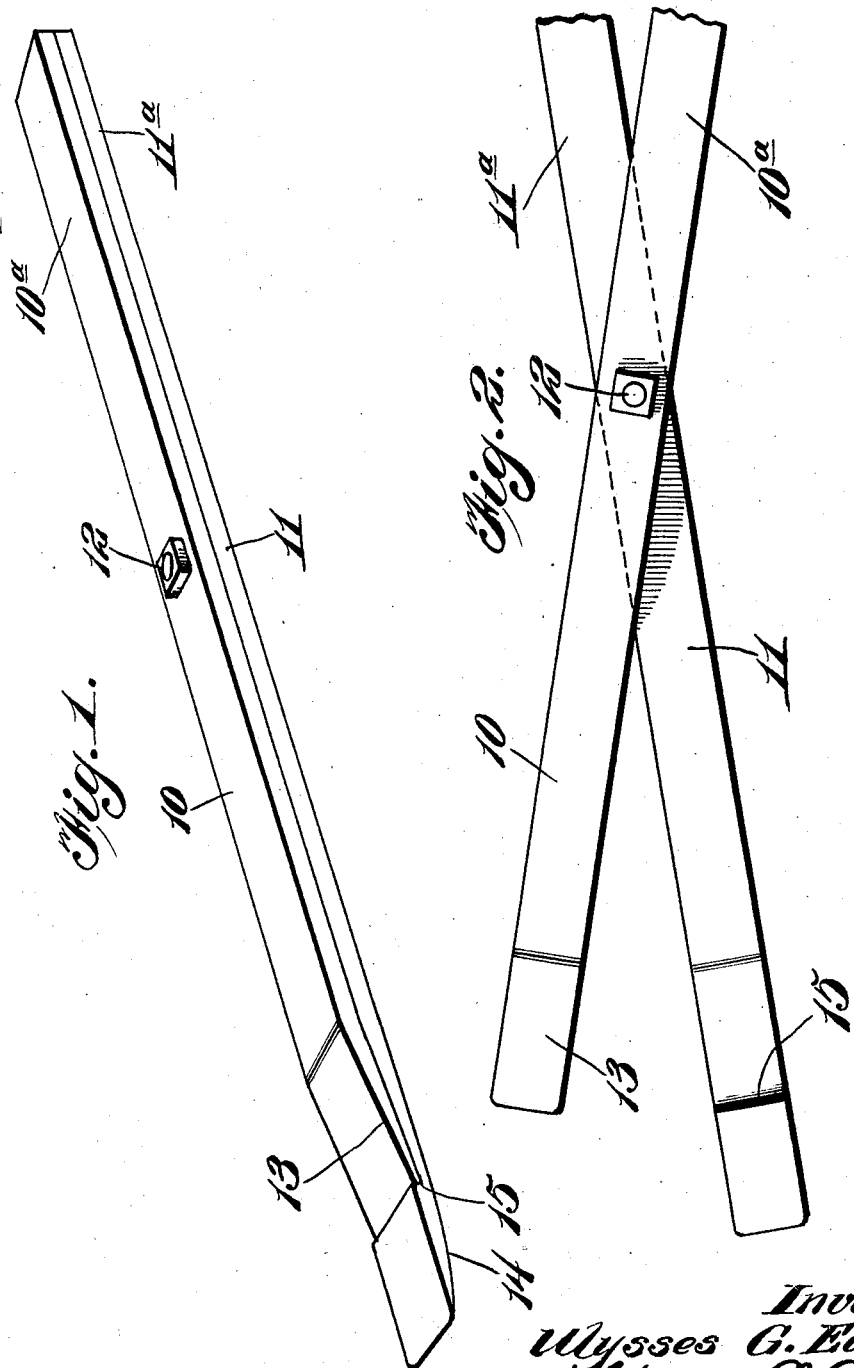

1,532,580

UNITED STATES PATENT OFFICE.

ULYSSES G. EDWARDS, OF GRANDVIEW, WASHINGTON.

TIRE TOOL.

Application filed September 23, 1924. Serial No. 739,349.

*To all whom it may concern:*

Be it known that I, ULYSSES G. EDWARDS, a citizen of the United States, residing at Grandview, in the county of Yakima and State of Washington, have invented certain new and useful Improvements in Tire Tools, of which the following is a specification, reference being had to the accompanying drawings.

This invention relates to tire tools and more particularly to a tool for removing clincher tires from the rims thereof, and an important object of the invention is to provide a device of this character which is relatively cheap to produce and which will be durable and efficient in service.

A further object of the invention is to provide a device of this character embodying two irons so connected and constructed that the simultaneous insertion of the irons beneath the tires may be readily effected, the construction further permitting separation of the members after insertion so that the bead may be elevated above the edge of the rim at points spaced about the circumference of the wheel.

These and other objects I attain by the construction shown in the accompanying drawings, wherein for the purpose of illustration is shown a preferred embodiment of my invention, and wherein:—

Figure 1 is a perspective view of a tire tool constructed in accordance with my invention, the sections thereof being in aligned relation as they would be in inserting the tool beneath a tire;

Figure 2 is a plan view showing the sections of the tool as the tool is moved to open position.

Referring now more particularly to the drawings, the tool comprises a pair of plier-connected members 10 and 11, the pivoted portions being arranged approximately centrally thereof and connected at 12. The member 10 is of the form generally employed in the construction of tire irons and slightly longer, being tapered at its tire engaging end as indicated at 13, and slightly bent at its tapered end as shown. The member 11 is formed from a flat strip of metal, one face of which, being that face at the opposite side of the member 11 from the member 10, is formed at its operating end with a taper 14 producing a wedge at its operating end. The opposite face of the member at a point spaced slightly from the end, is formed with a notch 15 shaped to receive the bent tapered end 13 of the member 10, and of such depth that when the end 13 is located within this notch, the upper surface of the end of the member is flush with the upper face 16 of the member 11. In the use of the device, the members 10 and 11 are positioned as shown in Fig. 1, so that these members overlie one another and present in appearance and effect a bar, one end of which is tapered, and while in this position are inserted beneath one bead of the tire in a manner usually employed in inserting tire irons of the ordinary construction. After having been inserted the handles 10ª and 11ª are separated causing separation of the operating ends so that they engage the bead of the tire at points spaced circumferentially thereof. While in this position the members 10 and 11 are employed as levers elevating the supported section of the bead over the rim so that the tire may be removed in the usual manner.

It will be obvious that the structure hereinbefore set forth is capable of certain changes and modifications in the construction as hereinbefore set forth, without materially departing from the spirit of my invention, and accordingly I do not limit myself to such specific structure except as hereinafter claimed.

What is claimed, is:

1. A tire tool comprising a pair of plier-connected members each being formed of a flat bar, the operating end of one of the bars being wedge-shaped and being provided at the side face thereof next adjacent the other of the bars with a notch, the other of the bars having its end portion tapered, and bent to one side to engage in the notch.

2. A tire tool comprising a pair of plier-connected members each being formed of a flat bar, the operating end of one of the bars being wedge-shaped and being provided at the side face thereof next adjacent the other of the bars with a notch, the other of the bars having its end portion tapered and bent to one side to engage in the notch, the operating end of the last named bar not extending above the surface of the first named bar at the end of the notch when the bars are in side to side relation.

In testimony whereof I hereunto affix my signature.

ULYSSES G. EDWARDS.